US008589642B2

(12) United States Patent
Maki et al.

(10) Patent No.: US 8,589,642 B2
(45) Date of Patent: Nov. 19, 2013

(54) COMPUTER SYSTEM DUPLICATING WRITES BY SYNCHRONOUS REMOTE COPY WITH MULTIPLE HOST COMPUTERS USING HETEROGENEOUS OPERATING SYSTEMS

(75) Inventors: Nobuhiro Maki, Yokohama (JP);
Kenichi Oyamada, Yokohama (JP);
Katsuhisa Miyata, Yokohama (JP);
Taketoshi Sakuraba, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 12/969,237

(22) Filed: Dec. 15, 2010

(65) Prior Publication Data

US 2011/0083033 A1 Apr. 7, 2011

Related U.S. Application Data

(60) Division of application No. 12/431,385, filed on Apr. 28, 2009, now abandoned, which is a continuation of application No. 11/003,613, filed on Dec. 6, 2004, now Pat. No. 7,543,121.

(30) Foreign Application Priority Data

Jan. 9, 2004 (JP) ................................ 2004-003898

(51) Int. Cl.
*G06F 12/00* (2006.01)
*G06F 13/00* (2006.01)
*G06F 13/28* (2006.01)
*G06F 15/167* (2006.01)
*G06F 7/00* (2006.01)
*G06F 17/30* (2006.01)

(52) U.S. Cl.
USPC ........... 711/157; 711/111; 711/141; 711/147; 711/162; 711/165; 709/214; 709/212; 709/213; 709/216; 707/999.01; 707/999.001

(58) Field of Classification Search
None
See application file for complete search history.

(56) References Cited

U.S. PATENT DOCUMENTS 5,948,062 A 9/1999 Tzelnic et al.
5,987,506 A 11/1999 Carter et al.
(Continued)

FOREIGN PATENT DOCUMENTS

JP 2002-7304 A 1/2002
JP 2003-316633 A 11/2003

OTHER PUBLICATIONS

"IBM TotalStorage Enterprise Storage Server: Implementing ESS Copy Services with IBM eServer zSeries," [online] Internet URL:http://www.redbooks.ibm.com/redbooks/pdfs/sg245680.pdf.

(Continued)

*Primary Examiner* — Sanjiv Shah
*Assistant Examiner* — Marwan Ayash
(74) *Attorney, Agent, or Firm* — Mattingly & Malur, PC (57) ABSTRACT

A computer system having a plurality of host computers and a storage system is provided which allows any one host computer to perform a global copy operation on any arbitrary or all storage areas in the storage system. To this end, storage areas provided by the disk devices are grouped into groups by allocating group numbers to a plurality of specified storage areas. The copy operation can be performed by specifying desired groups. Each of the groups is made up of sub-groups and the sub-groups are defined for each computer to assure a consistency of copy order of the sub-groups.

6 Claims, 10 Drawing Sheets (56) References Cited

U.S. PATENT DOCUMENTS

| | | | |
|---|---|---|---|
| 6,480,970 B1 * | 11/2002 | DeKoning et al. | 714/6.12 |
| 6,895,485 B1 | 5/2005 | DeKoning et al. | |
| 6,950,915 B2 | 9/2005 | Ohno et al. | |
| 2002/0103943 A1 | 8/2002 | Lo et al. | |
| 2005/0102553 A1 * | 5/2005 | Cochran et al. | 714/6 |
| 2005/0114465 A1 * | 5/2005 | Coronado et al. | 709/214 |

OTHER PUBLICATIONS

Network Attached Storage Architecture, vol. 43, Issue 11, (Nov. 2000), pp. 37-45, ISSN:0001-0782.

* cited by examiner

COPY GROUP LIST　　　　　　　　　　　　　　　　　　　1420

| COPY GROUP NO. | CONSISTENCY ASSURANCE LEVEL | SUB-COPY GROUP LIST POINTER | STATUS |
|---|---|---|---|
| 1 | SUB-GROUP ASSURED | ADDRESS 1 | TRANSITION TO STEADY STATE | ~5A
| 2 | COMPLETELY ASSURED | ADDRESS 2 | FREEZE | ~5B
| 3 | UNASSURED | ADDRESS 3 | STEADY STATE | ~5C

FIG. 3

SUB-COPY GROUP LIST　　　　　　　　　　　　　　　　1450

| SUB-COPY GROUP NO. | HOST ID | COPY CATEGORY | LOGICAL DISK LIST AVAILABILITY | LOGICAL DISK LIST NO. /LOGICAL DISK NO. | STATUS |
|---|---|---|---|---|---|
| 1 | HOST a | ASYNCHRONOUS REMOTE COPY | AVAILABLE | 1 | STEADY STATE | ~6A
| 2 | HOST b | SYNCHRONOUS REMOTE COPY | NONE | 3 | TRANSITION TO STEADY STATE | ~6B
| 3 | HOST c | SYNCHRONOUS REMOTE COPY | NONE | 11 | STEADY STATE | ~6C

FIG. 4

LOGICAL DISK LIST　　　　　　　　　　　　　　　　　1430

| LOGICAL DISK LIST NO. | 1ST LOGICAL DISK | 2ND LOGICAL DISK | 3RD LOGICAL DISK | 4TH LOGICAL DISK | 5TH LOGICAL DISK |
|---|---|---|---|---|---|
| 1 | 1 | 5 | 7 | | | ~7A
| 2 | 2 | 6 | 8 | 12 | 13 | ~7B
| 3 | 4 | 9 | | | | ~7C

SUB-LOGICAL DISK NO. TABLE ~1440

| LOGICAL DISK | COPY DESTINATION CONTROLLER ID | LOGICAL DISK | COPY CATEGORY | CONSISTENCY ASSURANCE LEVEL | COPY GROUP NO. | SUB-COPY GROUP NO. | |
|---|---|---|---|---|---|---|---|
| 1 | CONTROLLER B | 1 | ASYNCHRONOUS REMOTE COPY | SUB-GROUP ASSURED | 1 | 1 | ~8A |
| 2 | CONTROLLER B | 2 | ASYNCHRONOUS REMOTE COPY | COMPLETELY ASSURED | 2 | 2 | ~8B |
| 3 | CONTROLLER B | 4 | ASYNCHRONOUS REMOTE COPY | UNASSURED | 1 | | ~8C |
| 4 | CONTROLLER B | 3 | ASYNCHRONOUS REMOTE COPY | UNASSURED | 3 | 3 | ~8D |
| 5 | CONTROLLER B | 10 | ASYNCHRONOUS REMOTE COPY | SUB-GROUP ASSURED | 1 | 1 | ~8E |
| 7 | CONTROLLER B | 15 | ASYNCHRONOUS REMOTE COPY | SUB-GROUP ASSURED | 1 | 1 | ~8F |

FIG. 7

WRITE DATA MANAGEMENT INFORMATION ~1410

| | |
|---|---|
| LOGICAL DISK NO. | ~9A |
| WRITE ADDRESS | ~9B |
| WRITE DATA LENGTH | ~9C |
| WRITE TIME | ~9D |
| WRITE DATA POINTER | ~9E |
| SUB-CONTROLLER TRANSFER NECESSITY BIT | ~9F |

SETTING COMMAND

COPY GROUP GENERATION/DELETION COMMAND

| OP-CODE | COPY GROUP NO. | OPTION |
|---|---|---|

~600

SUB-COPY GROUP REGISTRATION/DEREGISTRATION COMMAND

| OP-CODE | COPY GROUP NO. | SUB-COPY GROUP NO. | COPY SOURCE VOLUME INFORMATION | COPY DESTINATION VOLUME INFORMATION | OPTION |
|---|---|---|---|---|---|

OPERATION COMMAND

| OP-CODE | COPY GROUP NO. | OPTION |
|---|---|---|

~620

COMPUTER SYSTEM DUPLICATING WRITES BY SYNCHRONOUS REMOTE COPY WITH MULTIPLE HOST COMPUTERS USING HETEROGENEOUS OPERATING SYSTEMS

This is a divisional application of U.S. Ser. No. 12/431,385, filed Apr. 28, 2009, which is a continuation application of U.S. Ser. No. 11/003,613, filed Dec. 6, 2004, now U.S. Pat. No. 7,543,121, the content of which is hereby incorporated by reference into this application.

INCORPORATION BY REFERENCE

The present application claims priority from Japanese application JP2004-003898 filed on Jan. 9, 2004, the content of which is hereby incorporated by reference into this application.

BACKGROUND

A technology disclosed in this patent application relates to a storage system and a method for controlling the storage system and more particularly to a storage system and a method for controlling the storage system well suited for copy processing designed for disaster recovery in a large-scale system having a plurality of computers and a plurality of storage devices.

As volumes of data have been growing, the number of host computers in a computer system and the capacity of a storage system are on the rise. A plurality of host computers are often linked together to process a large volume of data.

Further, as business functions increase their dependency on an information processing system and damages that can result from data loss become ever more serious, the disaster recovery of data assumes an ever growing importance.

When a disaster recovery is implemented on a computer system using conventional technologies. Each host computer has conventionally copied data stored in local storage areas under its control.

Copy functions used in large-scale system are described in detail in "IBM TotalStorage Enterprise Storage Server Implementing ESS Copy Services with IBM eServer zSeries".

SUMMARY

In a computer system in which a plurality of host computers cooperate with one another, when it is attempted to collectively copy all data stored in storage areas in a storage system controlled by the host computers, the storage areas in which the individual host computers can perform the copy function are limited to those storage areas under the control of the local host computer. This is because one host computer cannot handle the storage areas controlled by other host computers.

The present invention has been accomplished to solve the above problem. One aspect of this invention provides a computer system having a plurality of host computers and a storage system, in which one host computer is capable of collectively performing a copy operation on any desired or all storage areas in the storage system.

That is, in the storage system a plurality of storage areas provided by disk devices are divided into groups in advance for definition so that a copy operation can be done by specifying a desired group.

Each group is a set of sub-groups, each of which is defined for one host computer.

An update consistency is guaranteed for each group and for each sub-group. Other objects, features and advantages of this invention will become apparent from the description of this specification and the attached drawings.

DETAILED DESCRIPTION OF THE EMBODIMENTS

Figure 13A:
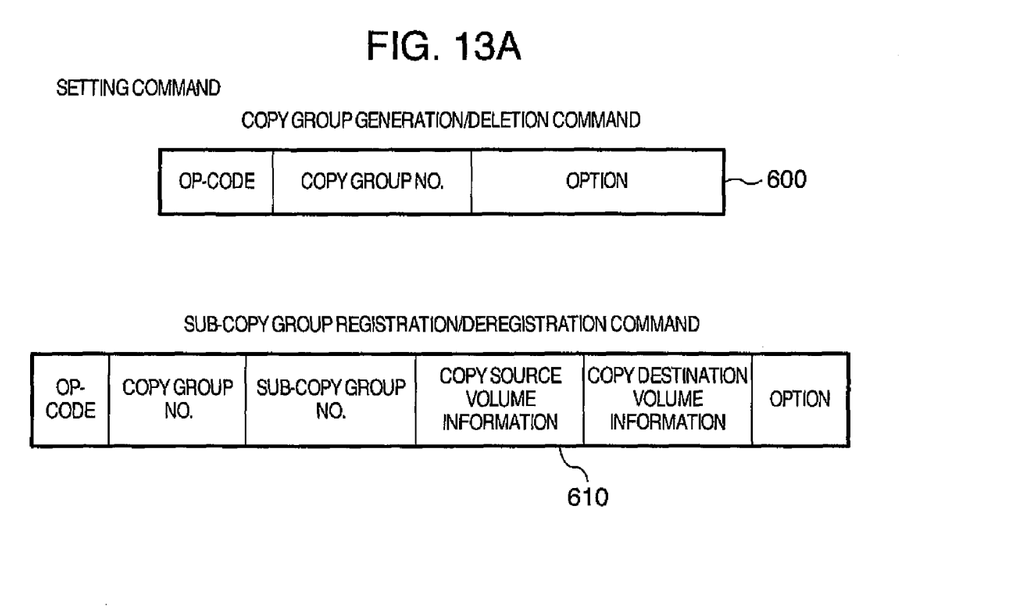
FIG. 13A shows types of setting commands.
Figure 13B:
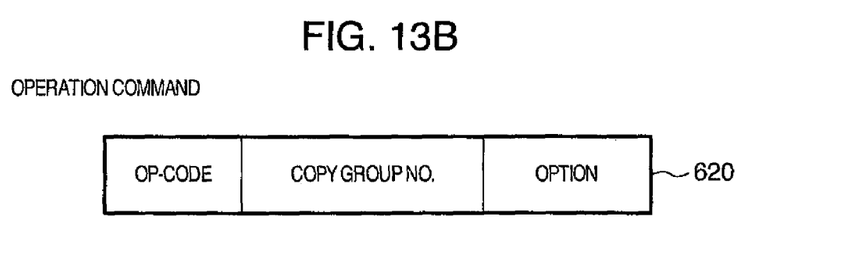
FIG. 13B shows a type of operation command.

One embodiment of this invention will be described by referring to FIG. 1 to FIG. 13.
0. System Configuration
First, referring to FIG. 1, a configuration of a computer system using a storage system of this embodiment will be explained.

Figure 1:
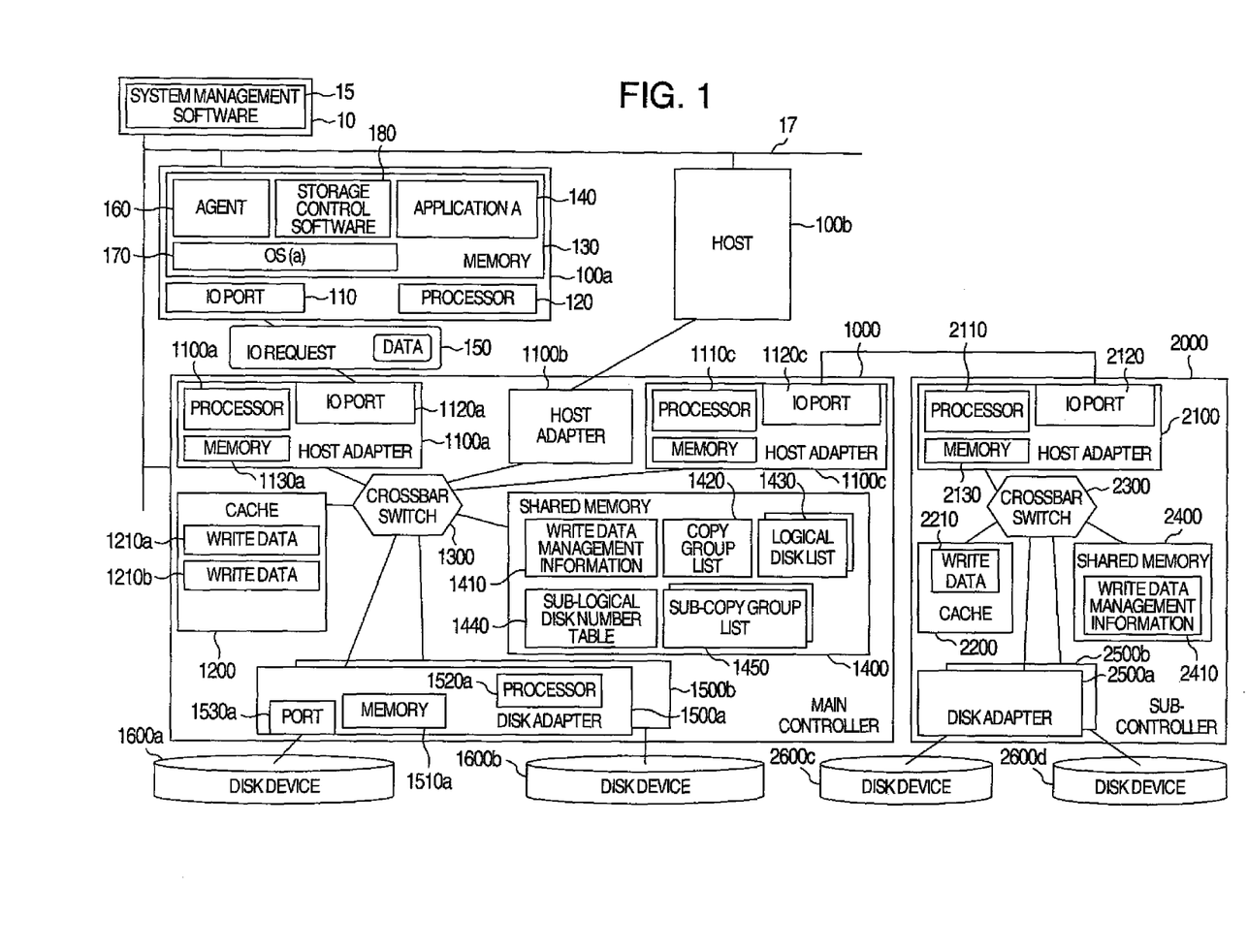
FIG. 1 is a diagram showing a configuration of a computer system using a storage system of one embodiment.

FIG. 1 shows a configuration of a computer system using the storage system of this embodiment.

The computer system comprises a plurality of hosts 10, 100 (100a, 100b), a main controller 1000, disk devices 1600 (1600a, 1600b) connected to the main controller 1000, a sub-controller 2000, and disk devices 2600 (2600c, 2600d) connected to the sub-controller 2000.

The main controller 1000 and the sub-controller 2000 may each be single or two or more in number. The number of disk devices connected to these controllers likewise may be one or two or more.

In this specification, a storage system including at least one of the storage controllers and the disk devices is referred to as a storage system. For example, a storage system comprises the main controller 1000 and the disk devices 1600 (1600a, 1600b), another storage system comprises the sub-controller 2000 and the disk devices 2600 (2600c, 2600d) in FIG. 1.

The main controller 1000 is connected to the host 10 and the hosts 100a, 100b via a communication path. In this embodiment, a process of copying from the main controller 1000 to the sub-controller 2000 for disaster recovery will be explained.

The main controller 1000 has a shared memory 1400, a cache memory 1200, a crossbar switch 1300, host adapters (port adapters) 1100 (1100a, 1100b, 1100c) and disk adapters 1500 (1500a, 1500b).

The shared memory 1400, the cache memory 1200, the host adapters 1100 (1100a, 1100b, 1100c) and the disk adapters 1500 (1500a, 1500b) are interconnected through the crossbar switch 1300.

The disk adapters 1500 are connected to the disk devices 1600 through ports 1530. The disk adapters manage data in the disk devices and transfer data to other devices as required.

The host adapters 1100 have a processor 1110, a memory 1130 and an IO port 1120. The host adapters receive an IO request from a host and perform an operation of remote copy to the sub-controller 2000 as required.

The sub-controller 2000, like the main controller 1000, has a shared memory 2400, a cache memory 2200, a crossbar switch 2300, a host adapter 2100 and disk adapters 2500 (2500a, 2500b).

The hosts 100 have a processor 120, a memory 130 and an IO port 110. Though not shown, the processor, memory and IO port are interconnected through a communication path such as internal bus. Operating systems (OS's) running on individual hosts may differ from one another and IO communication protocols between the hosts and controllers may also differ. Though not shown, the host 10 similarly has a processor, a memory and an IO port, all interconnected through a communication path such as internal bus.

1. Copy Group Generation Procedure in Controller

Here, a procedure for generating copy groups and sub-copy groups in the main controller 1000 will be described.

1.1 Concept of Copy Groups and Sub-Copy Groups

First, a concept of copy groups and sub-copy groups introduced in this embodiment will be explained.

This embodiment enables a plurality of storage areas on the main controller 1000 handled by a plurality of hosts 100 to be copied in a single operation. The storage areas are represented in different ways in different systems but in this embodiment they are treated as logical disk devices. The logical disk devices (or simply referred to as "logical disks") are a logical storage area made up of a single or two or more disk devices. More precisely, each of the logical disks may be defined as all or a part of storage areas in one disk device or as a set of (a part or all of) storage areas in individual disk devices.

To realize this copy operation, the main controller manages and operates the logical disk devices using "copy groups" and "sub-copy groups."

The "copy group" is a group of storage areas to be processed by a global copy operation and defined as a set of sub-copy groups. The "sub-copy group" refers to those among the storage areas to be processed by the global copy which are specified by individual hosts as an object to be copied.

A copy group is specified by a system administrator specifying storage areas he or she wants copied. For example, a copy group may include storage areas that are handled as a charging unit, a set of storage areas that are divided so as to have an appropriate volume of data for a single copy operation, or storage areas classified by a management section in charge.

The main controller 1000 manages the copy groups and the sub-copy groups by using a copy group list 1420, a sub-copy group list 1450 and a logical disk list 1430. These three lists reside on the shared memory 1400 in the main controller 1000.

Referring to FIG. 2 to FIG. 5, these lists will be explained in detail.

Figure 2:
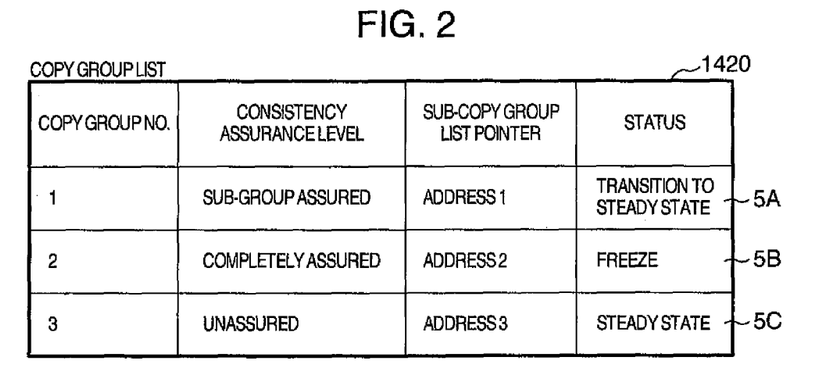
FIG. 2 is a table showing a copy group list.
Figure 3:
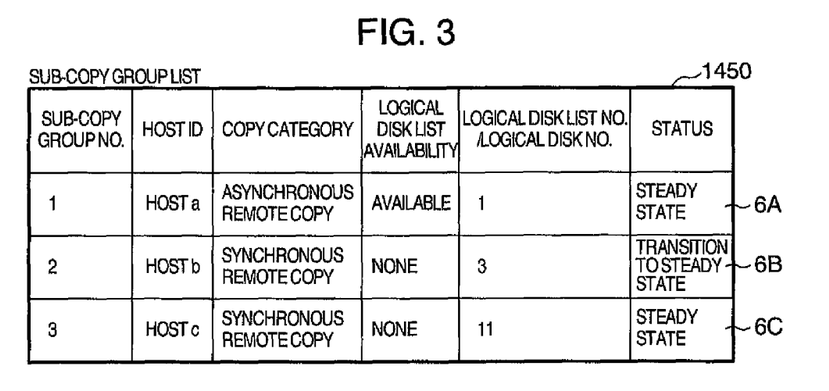
FIG. 3 is a table showing a sub-copy group list.
Figure 4:
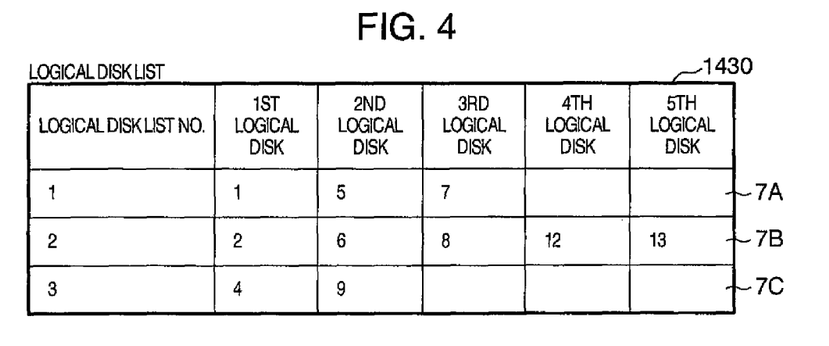
FIG. 4 is a table showing a logical disk list.
Figure 5:
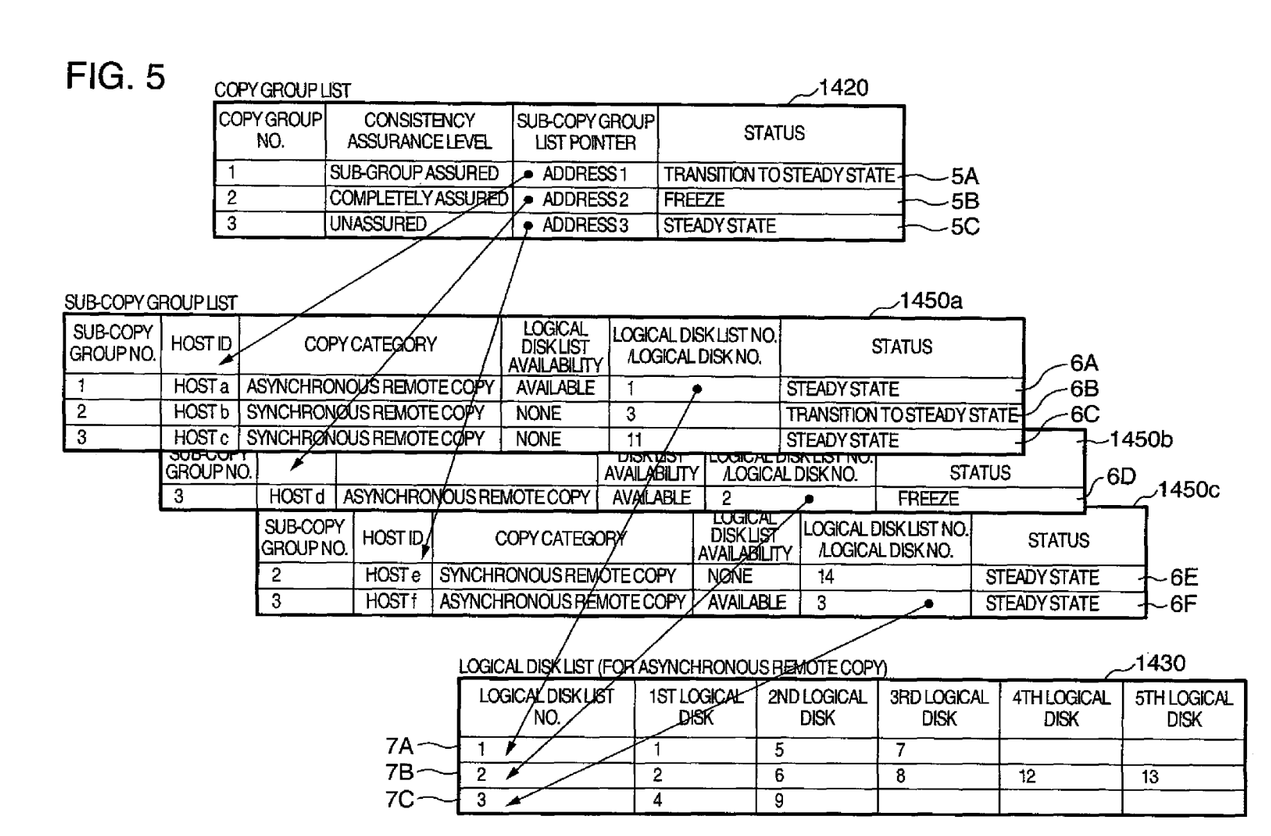
FIG. 5 illustrates a relation among the copy group list, the sub-copy group list and the logical disk list.

FIG. 2 shows a copy group list.
FIG. 3 shows a sub-copy group list.
FIG. 4 shows a logical disk list.
FIG. 5 shows a relation among the copy group list, the sub-copy group list and the logical disk list.

As shown in FIG. 2, the copy group list is a list of all copy groups defined by the main controller 1000. The copy group list has information on a copy group number, a consistency assurance level, a sub-group list pointer, and a status.

The "copy group number" is a number that uniquely identifies a copy group of interest.

The "consistency assurance level" is a criterion that defines a copy operation performed during a copy process and in the event of a fault. The consistency means that data in the storage devices are updated in the same order as the data arrives from a host. When the consistency assurance level is "completely assured", the consistency (an order in which data is updated to disk devices connected to the sub-controller 2000) is assured for all logical disks registered with a copy group. When the consistency assurance level is "sub-group", the consistency is assured at the sub-copy group level. When it is "unassured", the consistency is not assured.

The "sub-group list pointer" indicates an address of the sub-group list in the shared memory. The "status" indicates a current state of the copy group. The consistency assurance level and the status will be described later in more detail.

The sub-copy group list, as shown in FIG. 3, is a list of sub-copy groups making up a copy group.

There is a sub-copy group list for each copy group. That is, in the case of FIG. 2, the copy group list has three entries. This means that there are three sub-copy group lists.

The sub-copy group list has information on a sub-copy group number, a host ID, a copy category, a presence/absence of logical disk list, a logical disk list number/logical disk number, and a status.

The "sub-copy group number" is a number that uniquely identifies a sub-copy group of interest.

The "host ID" is information by which the main controller 1000 and the sub-controller 2000 can uniquely identify the host 100. The "copy category" represents a kind of copy function, such as asynchronous remote copy and synchronous remote copy.

The "asynchronous remote copy" is a copy procedure by which, in response to a copy IO command from a host, the main controller 1000 reports an end of the associated IO operation without waiting for the copy to be finished.

The "synchronous remote copy" is a copy procedure by which, in response to each copy IO command from a host, the main controller 1000 confirms that the associated copy operation has been performed on the sub-controller 2000 before reporting an end of the IO operation.

The "availability of logical disk list" indicates whether a sub-copy group of interest in the main controller is made up of multiple logical disks and represented as a list. If "available" is entered in this column, this indicates that the sub-copy group is represented by a logical disk list; and if "not available" is entered, this indicates that the sub-copy group is represented by a single logical disk.

The sub-copy group of this embodiment is introduced so that, when the copy category is asynchronous remote copy, the consistency of the update order in which a plurality of logical disks are copied can be assured and therefore a fault freeze also assured.

Thus, when the copy category is synchronous remote copy, it is assumed that the value of the availability of logical disk list is "not available" and that the sub-copy group is made up of a single logical disk.

The "logical disk list number/logical disk number" represents a logical disk list sub-group number or a logical disk number. The time this information represents a logical disk list number is when the value of the availability of logical disk list is "available." When it refers to a logical disk number, the value of the presence/absence of logical disk list must be "not available." Here, the logical disk number means each of serial numbers assigned to logical disks of a fixed size handled by the controller as control units. The storage areas in the controller are handled as a set of logical disks and are each assigned a logical disk number.

The storage areas handled by a host may or may not be of a size equal to the associated logical disks. The status represents a current state of a sub-copy group. The detail of the status will be described later.

The logical disk list of FIG. 4 shows logical disks for each sub-copy group in the form of a list. One such logical disk list is allocated to each of those sub-copy groups handled by the copy function of the main controller whose logical disk list availability is "available". The logical disk list shows a logical disk configuration in a sub-copy group. An entry 7A in the logical disk list, for example, shows that a sub-copy group with sub-copy group number "1" is made up of three logical disks 1, 5, 7.

These three lists are related to one another as shown in FIG. 5.

FIG. 5 shows an example case where there are three copy groups in the main controller. The copy group list has three registered copy groups. Entries 5A, 5B, 5C in the copy group list each indicate by their sub-copy group list pointers locations (in the shared memory) of the sub-copy group lists (1450a, 1450b, 1450c). There are as many sub-copy group lists as there are registered copy groups. In this example, there are three sub-copy group lists. In these sub-copy group lists, those entries whose logical disk list availability is "available" (6A, 6D, 6F) further refer to logical disk lists by the column of logical disk list number/logical disk number.

1.2 Procedure for Generating Copy Groups and Sub-Copy Groups

Next, by referring to FIG. 6, FIG. 8 and FIG. 9, the procedure for generating copy groups and sub-copy groups will be explained.

Figure 6:
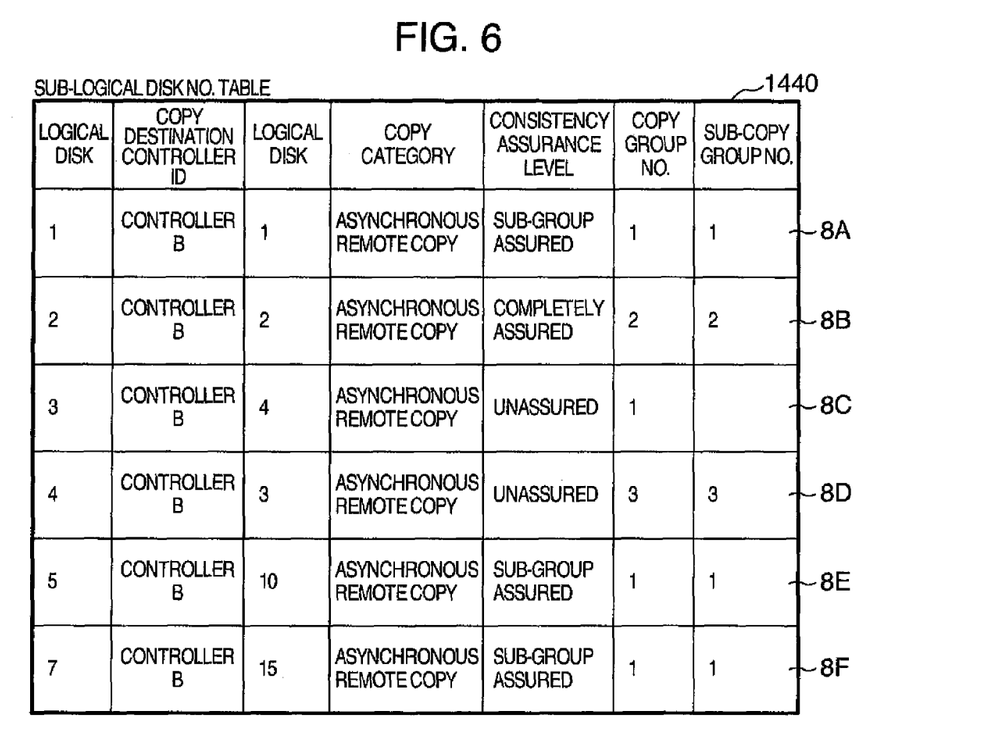
FIG. 6 is a sub-logical disk number table.

FIG. 6 shows a sub-logical disk number table.

Figure 8:
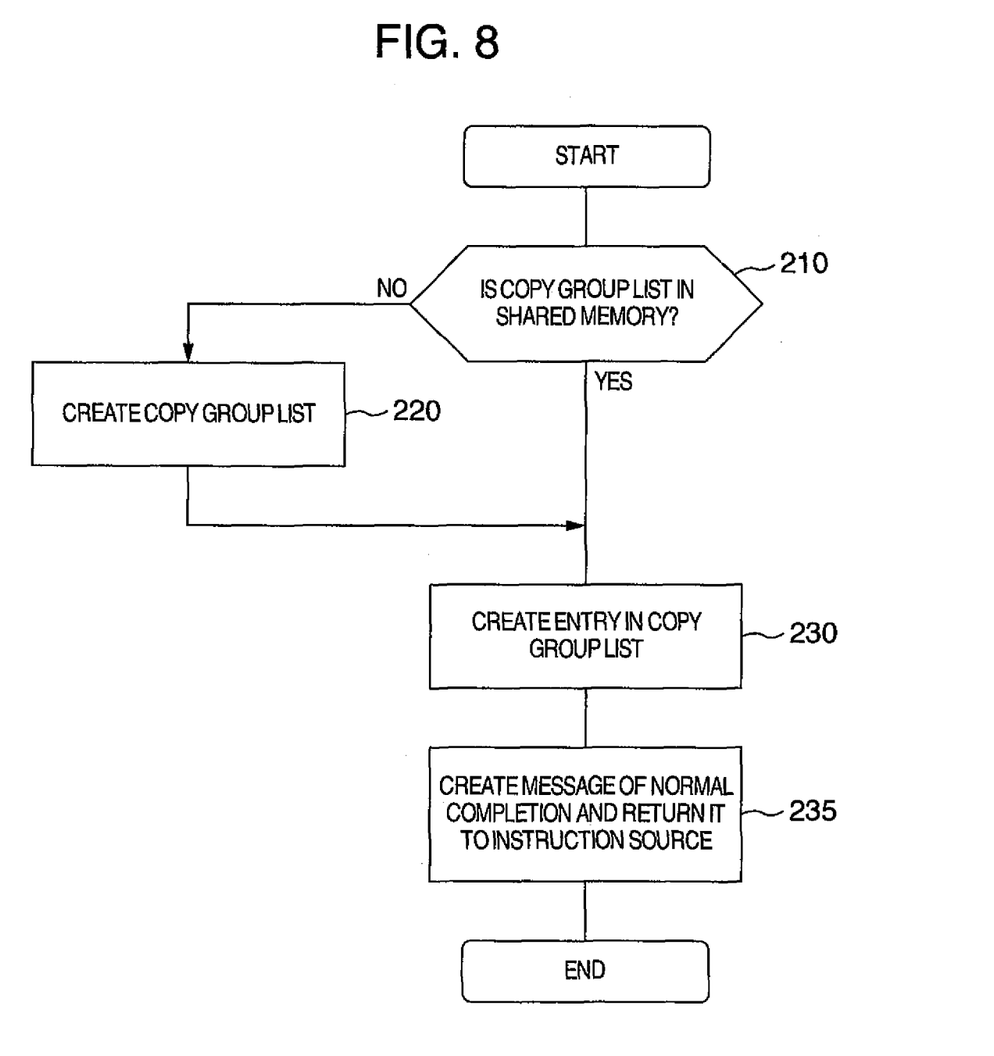
FIG. 8 is a flow chart showing a copy group generation procedure.

FIG. 8 is a flow chart showing a copy group generation procedure.

Figure 9:
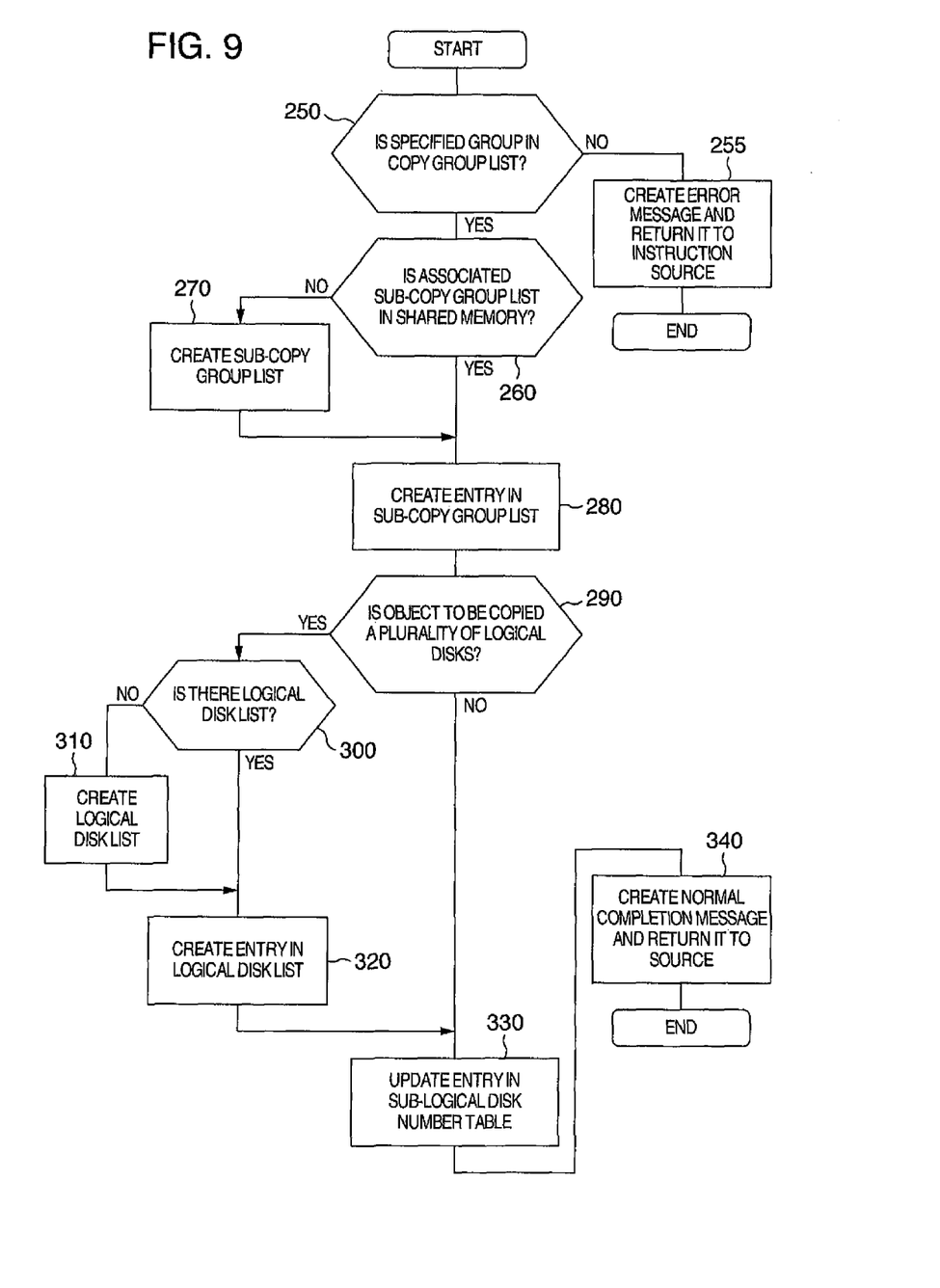
FIG. 9 is a flow chart showing a sub-copy group generation procedure.

FIG. 9 is a flow chart showing a sub-copy group generation procedure.

The procedure begins with generating copy groups.

When the main controller receives a copy group generation command issued by the host 100, the IO port 1120 in the host adapter 1100 accepts the copy group generation command and informs the processor 1110 that it has received the copy group generation command. The command issued by the host 100 to instruct the copy group generation will be detailed later.

The processor checks if a copy group list 1420 exists in the shared memory 1400. If the copy group list is found not present (step 210, no), the processor generates a copy group list (step 220).

Next, the processor adds a new entry to the copy group list (step 230). The status column for the new entry is set to "suspended". After step 230, the processor generates a message to indicate that the instruction has successfully been completed and returns it to the host 100, a source of the instruction (step 235).

Next, sub-copy groups are generated.

When the main controller receives a sub-copy group registration command issued by the host 100, the IO port 1120 in the host adapter 1100 accepts the sub-copy group registration command and informs the processor 1110 that it has accepted the sub-copy group registration command. A command issued by the host 100 to instruct the sub-copy group registration will be detailed later.

The processor checks a copy group number to see if a copy group required by the sub-copy group registration command to be registered exists in entries in the copy group list 1420 in the shared memory 1400.

If the entry of interest is found not present in the copy group list, the processor generates an error message indicating that the copy group does not exist in the list and returns it to the source of registration command (step 255). If the entry of interest is found to exist in the copy group list (step 250, yes), a check is made as to whether the specified sub-copy group list exists in the shared memory. This check is based on a presence or absence of a value in a pointer column in the sub-copy group list at the entry in the copy group list.

If the sub-copy group list does not exist in the shared memory (step 260, no) the processor generates a sub-copy group list (step 270).

If the sub-copy group list exists in the shared memory (step 260, yes), the processor adds an entry to the sub-copy group list according to the content of the registration command (step 280). After the entry has been added to the sub-copy group list, if there are two or more logical disks required by the registration command to be copied (step 290, yes), a check is made as to whether a logical disk list 1430 exists in the shared memory. If the logical disk list is found not to exist (step 300, no), the processor creates the logical disk list (step 310).

When the logical disk list is found to exist, the processor creates or updates its entries according to the content of the registration command (step 320).

After step 320, entries in the sub-logical disk number table 1440 are updated (step 330).

The sub-logical disk number table 1440, as shown in FIG. 6, is a table that contains information on logical disks in the copy destination sub-controller that match all the logical disks in the controller. By referring to the sub-logical disk number table 1440, it can be determined which logical disk in the main controller 1000 should be copied to which disk in the sub-controller 2000. Thus, this table resides on the controller at all times. For the logical disks that are not covered by the copy operation, the associated entries have "none" in the copy destination controller ID column and in the copy destination logical disk column.

The copy category and the consistency assurance level may be redundantly entered in the sub-logical disk number table for faster access, although this is not an essential step because these information is contained in the copy group list 1420 and the sub-copy group list 1450.

The copy group number and the sub-copy group number are used to determine a present state of a fault from the copy group list 1420 and the sub-copy group list 1450.

As a final step, the processor writes in the sub-copy group list pointer of the entry in the copy group list an address where the sub-copy group list is to be stored, creates a message that the registration instruction from the host is successfully completed and returns it to the source of the registration instruction (step 340). After the message has been sent, the copy operation can be initiated for the storage areas specified by the group.

2. Copy Operation in Controller

Here, referring to FIG. 7 and FIG. 10 to FIG. 12, the copy operation in the controller 1000 will be explained for a normal operation and for an abnormal operation.

Figure 7:
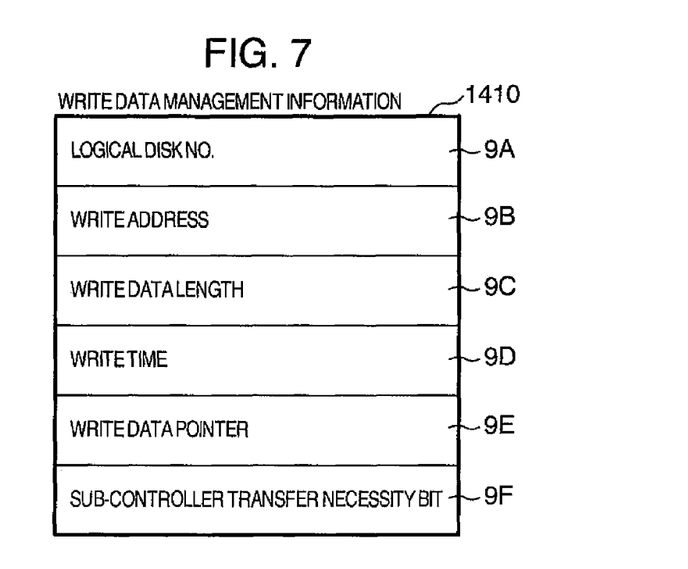
FIG. 7 is a table showing write data management information.

FIG. 7 shows a table of write data management information.

Figure 10:
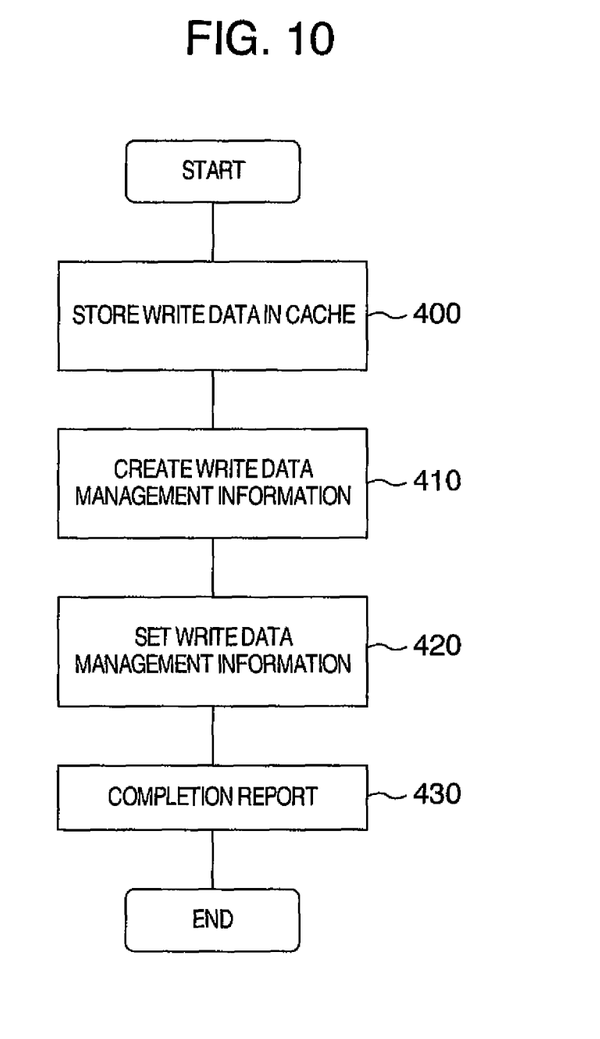
FIG. 10 is a flow chart showing operations of a main controller and a sub-controller during a copy process.

FIG. 10 is a flow chart showing a sequence of steps performed by the main and sub-controllers during the copy operation.

Figure 11:
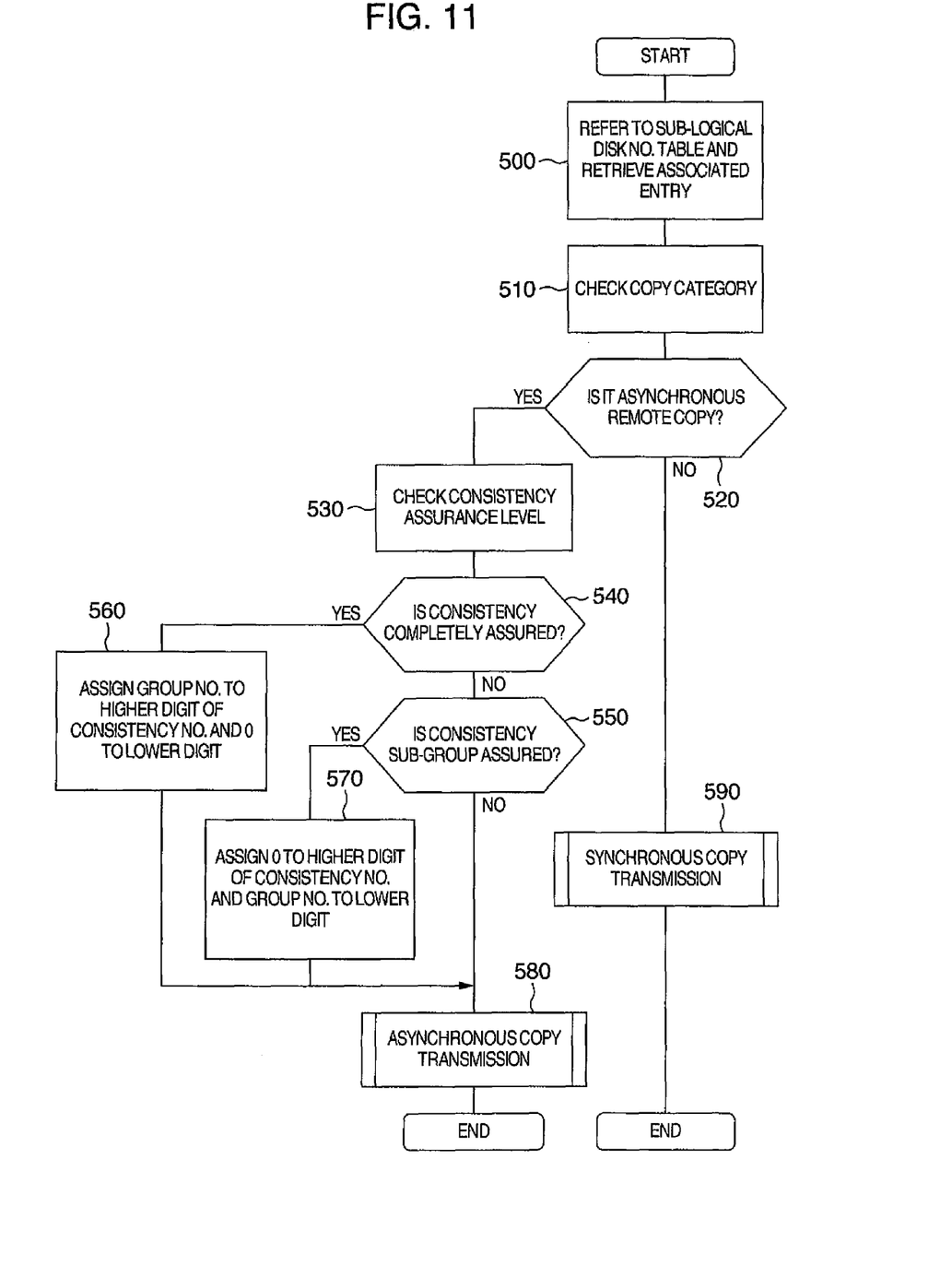
FIG. 11 is a flow chart showing a procedure for determining a copy method.

FIG. 11 is a flow chart showing a procedure to determine a copy method.

Figure 12:
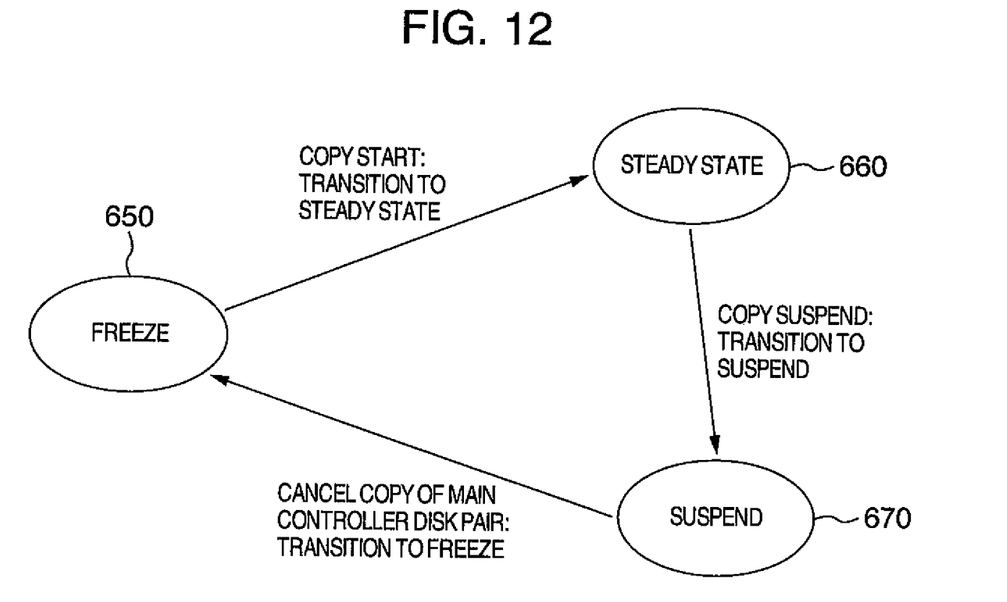
FIG. 12 illustrates a status transition during the copy process.

FIG. 12 is a status transition table for a copy operation.

2.1 Normal Operation (1) Operation during Copy Processing

With the above "copy group generation procedure in controller" complete, the copy operation for each copy group can be initiated.

Now, a sequence of steps performed by the main controller and the sub-controller during the copy operation will be explained.

First, let us explain, by referring to FIG. 7, about write data management information 1410, 2410 which is used in the copy processing between the main controller 1000 and the sub-controller 2000.

The write data management information 1410, 2410 is held in both the main controller and the sub-controller.

A write address 9B is information about an address in logical disk in which the associated write data is to be written (e.g., information on an address of 2 MB area from the head of the logical disk). A write data length 9C is information on a length of the associated write data and is contained in an IO request. 9A, 9B and 9C are all information contained in the write IO request. A write time 9D is time information used to assure a copy order among consecutive write requests. The write time is handled differently according to the copy method and to whether or not it is given by the IO issuing source host 100. The handling of the write time will be described later. A write data pointer 9E is a pointer in the cache to the associated write data. A sub-controller transfer necessity bit 9F is information indicating that the associated write data needs to be transferred to the sub-controller 2000. In write data management information 2410 in the sub-controller 2000, the sub-controller transfer necessity bit 9F is 0. The decision as to whether or not the write data transfer is necessary is made by checking a sub-logical disk setting for the entry in the sub-logical disk number table 1440. That is, if a sub-logical disk is set, the associated necessity bit is set to "necessary".

Next, a sequence of steps performed during the copy operation will be explained by referring to FIG. 10.

An IO request 150 issued by the host 100 is received by an IO port 120a in the main controller 1000. Upon receipt of the IO request, the processor 1110 in the host adapter analyzes the IO request. If the request is a write request, the processor stores the write data in the cache memory (step 400). Next, the processor 1110 creates write data management information 1410 in the shared memory (step 410).

Further, the processor retrieves a write address from the IO request, stores it in the write data management information, and, if necessary, sets a timer value of the main controller as a write time and also makes appropriate setting on the write data pointer 9F and the sub-controller transfer necessity bit 9F (step 420).

While in this example the write time uses a timer in the main controller, a timer in the host 100 may also be used. As a last step, a processing completion is reported to the host 100, the IO request source.

Next, a procedure up to the initiation of a copy transmission by the main controller will be explained. When the transmission procedure is executed by the main controller 1000, a decision needs to be made first as to which copy method is used.

First, the processor 1110c of the host adapter 1100c connected to the sub-controller through a communication channel refers to the write data management information 1410 in the shared memory 1400, retrieves the write data management information 1410 whose write time is oldest and stores it in a memory 1120c. The processor then checks the logical disk number 9A in the retrieved write data management information 1410. Based on the retrieved logical disk number 9A, the processor refers to the sub-logical disk number table 1440 in the shared memory and retrieves an entry in the table whose logical disk column value matches the logical disk number 9A and saves it in the memory 1130c (step 500). The processor 1110c refers to the copy category column of the retrieved entry (step 510). If the step 510 finds that the copy operation is an asynchronous remote copy (step 520, yes), the processor 1110c checks a consistency assurance level column of the saved entry (step 530). If the consistency assurance level column has a "completely assured" level (step 540, yes), the consistency group number to be used in the asynchronous remote copy is assigned a group number in a higher digit and 0 in a lower digit (step 560).

If the consistency assurance level column has a "subgroup" level (step 550, yes), the consistency group number is assigned 0 in a lower digit and a sub-group number in a lower digit (step 570). Here, the consistency group represents a range in which a copy order is assured for an asynchronous remote copy from the main controller to the sub-controller. That is, in the operation of step 560 the update order is assured in units of copy groups and, in the operation of step 570, the update order is assured in units of sub-copy groups. The information on consistency group number is written in each frame of data transmitted from the main controller to the sub-controller, and the sub-controller checks the number of each frame received to assure the update order of data being copied.

After step 560 or step 570, or when the assurance level is a "unassured" level, the processing moves to asynchronous copy transmission processing (step 580). This processing itself is a normal copy operation by the main controller 1000.

If step 510 finds that the copy method is not an asynchronous remote copy (step 520, no), a synchronous copy transmission is performed (step 590).

This processing also is a normal operation by the main controller.

(2) Operation at Start of Copy

The copy operation in units of copy groups can be started upon completion of the "copy group generation procedure in controller".

When the main controller 1000 receives a copy start command issued by the host 1000, the processor 1110 is notified of the reception of the copy start command. The processor 1110 then refers to the copy group list 1420, the sub-copy group list 1450, the logical disk list 1430 and the sub-logical disk number table 1440 and starts copying to the sub-controller 2000. As to a command for instructing a copy start issued by the host 100, a detailed explanation will be given later.

Whenever it is desired to add a sub-copy group to the copy group, a procedure for additionally registering a sub-copy group with the copy group is performed. The additional registration can be achieved by performing the procedure shown in FIG. 9. It is however noted that when the consistency assurance level specified by the copy group list 1420 is a completely assured level and if different copy categories are registered for different sub-copy groups in the same copy group, the consistency level is not assured.

(3) Operation during Copy Suspend

To start a copy suspend, the host 100 issues a copy suspend command to the main controller 1000. The main controller 1000, upon receiving the copy suspend command, initiates copy suspend processing.

The copy suspend in units of copy groups changes its operation according to a content of the consistency assurance level specified by the copy group list 1420. That is, when the consistency level is a "completely assured" level, the consistency of all logical disks registered with the copy group (the order of update to the sub-disk devices) is assured; when the consistency level is a "sub-group" level, the consistency at the sub-copy group level is assured; and when it is "unassured", the copy suspend that does not assure the consistency is performed.

The copy suspend with a "completely assured" consistency level is realized as follows.

In the case of the asynchronous remote copy suspend, since the consistency group is set in a range of copy groups as described above, the consistency at the copy group level is assured by performing the conventional suspend operation on the asynchronous remote copy. This suspend operation itself is a normal operation by the main controller 1000.

In the case of the synchronous remote copy, the copy suspend is realized by suspending the copy to the sub-controller 2000 of write data registered with the cache memory 1200. This is because in the case of the synchronous remote copy, the IO command from the host is first stored in the cache 1200 and then successively executed. That is, when a synchronous remote copy suspend command is received by the main controller 1000, the processor 1110 that received the command stops the transfer of the write data in the cache 1200 to the copy processing. At the same time, the processor performs a copy suspend procedure on the logical disk in question in the copy group.

The copy suspend procedure takes time because it is performed on a plurality of logical disks. But since, prior to the copy suspend procedure, a step is taken to stop the transfer of write data in the cache to the copy processing, there is no chance of the data moving to the copy processing. After the copy suspend procedure is temporarily halted, the step for stopping the transfer of write data in the cache to the copy processing is canceled.

A copy suspend with a "sub-group" consistency level is realized as follows.

In the case of the asynchronous remote copy suspend, since the consistency group is set in a range of sub-copy groups as described above, the consistency at the sub-copy group level is assured by performing the conventional suspend operation on the asynchronous remote copy for each sub-copy group. This suspend operation itself is a normal operation by the main controller 1000.

In the case of the synchronous remote copy, since the sub-copy group is always set with a single logical disk, the suspend operation is performed on all logical disks registered with the copy group. The suspend operation itself is executed by the processor 1110 in the host adapter that accepted the suspend command.

A copy suspend with an "unassured" consistency level is realized as follows. In the case of the unassured consistency level, the process is the same as that of the copy suspend with the sub-group consistency level for both the synchronous remote copy and the asynchronous remote copy. As a result, the unassured copy suspend has the same consistency assurance level as the sub-group assured copy suspend (i.e., the consistency of the volumes or storage areas to be copied on the sub-controller side are assured of the sub-copy group level). A difference between the unassured suspend and the sub-group assured suspend lies in the fault operation described later.

(4) Operation in Copy Group Status Management

The copy operation causes a shift in the processing even among logical disks in the same copy group. Thus, the copy operation state may differ from one logical disk to another. To manage different states of logical disks in the copy group, the main controller 1000 performs a status monitoring.

Now, a copy group status management will be explained.

The main controller monitors statuses of logical disks in units of sub-copy groups. The status monitoring is done, as shown in a copy status transition table of FIG. 12, by writing in the status column of the sub-copy group list in the main controller 1000 a transition state (transition to steady state, transition to suspend and transition to freeze) when not all the logical disks are in the same state and a current state when all the logical disks are in the same state (freeze 650, normal 660, suspend 670). This writing operation is done by the processor 1110c in the host adapter 1100c connected to the sub-controller. Next, the main controller 1000 collects the statuses of all sub-copy groups registered with the copy group and determines a "status" of the copy group. The process of determining the status of the copy group is the same as that of the sub-copy group. The "status" thus determined is written in the status column of the copy group list in the main controller.

Referring to FIG. 5, an example procedure for determining the status is described as follows.

Looking at 6F in the sub-copy group list, a sub-copy group number 3 has all its registered logical disks 4, 9 (in 7C of logical disk list) in a steady state and therefore the status of 6F is also "steady". Further, since 6E and 6F are all steady, the status of 5C in the copy group list 1420 is "steady".

When a status of the copy group is notified as requested by the host 100, a status of the associated entry in the copy group list is used.

2.2 Fault Operation

A fault operation during copy processing differs depending on the consistency assurance level specified in the copy group list 1420. That is, in the case of "completely assured" level, all the volumes or storage areas registered with the copy group are frozen. In the case of "sub-group" assured level, the associated sub-group is suspended. In the case of "unassured" level, the associated logical disk is suspended.

A fault operation with "completely assured" level is realized as follows. Since the consistency group is set in a range of copy groups, a fault freeze operation of asynchronous remote copy is realized by performing the conventional fault freeze operation for the asynchronous remote copy. This freeze processing itself is a normal operation by the main controller.

A fault freeze operation of synchronous remote copy is realized by freezing write data registered with the cache 1200. This is because in the synchronous remote copy the IO command from the host is first stored in the cache 1200 and then successively executed. That is, when a synchronous remote copy fault is detected by the main controller, the processor 1110 that detected the fault stops the transfer of the write data in the cache 1200 to the copy processing.

At the same time the processor performs a procedure for fault freeze of copy processing on the associated logical disks in the copy group. After the procedure for fault freeze of copy is temporarily halted, the procedure for stopping the transfer of write data in the cache to the copy processing is canceled.

A fault operation with "sub-group" assured level is realized as follows. Since the consistency group is set in a range of sub-copy groups, a fault suspend operation of asynchronous remote copy is realized by performing the conventional fault suspend operation for the asynchronous remote copy. This suspend processing itself is a normal operation by the main controller.

In the case of synchronous remote copy, since the sub-copy group is always set with a single logical disk, a fault suspend operation is performed on faulted logical disk pairs registered with the copy group. The suspend operation itself is performed by the processor 1110 in the host adapter.

A fault operation with "unassured" level is realized as follows. In the case of synchronous remote copy, the procedure is the same as that for the sub-group assured level. In the case of asynchronous remote copy, a suspend command is issued to the failed logical disk of the sub-copy group. To realized this it is necessary to specify ignoring the consistency assurance of the consistency group when creating the sub-copy group.

3. Link between Controller External Interface and System Management Host 3.1 External Interface of Controller Commands are defined as external interface of the controller for the host 100 to set and operate copy groups These commands can be classified largely into two kinds: a setting command and an operation command.

The setting command is a command for the host 100 to set copy groups and sub-copy groups in the storage areas (volumes) for information management. The operation command is a command to operate the copy groups in the storage areas.

These commands will be explained by referring to FIGS. 13A and 13B.

FIG. 13A shows a format of the setting command.

FIG. 13B shows a format of the operation command.

(1) Setting Command

Among the setting commands there are a copy group generation/deletion command 600 shown in FIG. 13A and a sub-copy group registration/deregistration command 610. The copy group generation/deletion command 600 and the sub-copy group registration/deregistration command 610 have different formats.

An "op-code" is a field representing a content of specified operation. A "copy source volume information and copy destination volume information" is information to identify a disk device and its volume and includes controller ID and logical disk number. An "option" may specify, for example, a consistency assurance level. The option may have two or more specifications.

When generating a copy group, for example, the "op-code" field has a code representing "copy group generation". In the case of 5A in the copy group list 1420 of FIG. 2, "copy group number" is specified with "1" and "option" is specified with "sub-group" as a consistency assurance level.

When the host issues a copy group generation command, an entry is added to the copy group list 1420 in the shared memory 1400 of the main controller 1000.

Conversely, when the host issues a copy group deletion command, the entry in the copy group list 1420 that corresponds to the "copy group number" is deleted.

For the sub-copy group registration, the "op-code" field is given a code representing "sub-copy group registration". In the case of 6A in the sub-copy group list 1450 of FIG. 3, the "copy group number" is specified with "1"; the "sub-copy group number" is specified with "1"; the controller ID in the "copy source volume information" is specified with "controller B"; the logical disk number is specified with "1, 5, 7"; and the logical disk number in the "copy destination volume information" is specified with copy destination logical disk numbers to which data of copy source logical disk number "1,
5, 7" is to be copied. The "option" is specified with "asynchronous remote copy" as a copy category.

The host ID can be retrieved from protocol information when a command is received.

When the main controller 1000 receives a sub-copy group registration command from the host, it adds an entry to the sub-copy group list 1450 and sets a value. If there are two or more logical disk numbers in the "copy destination volume information", entries are added to the logical disk list 1430 and values are set.

Then, an entry is added to the sub-logical disk number table 1440 and a value is set. The "logical disk" column in the sub-logical disk number table 1440 is specified with a logical disk number of the "copy source volume information" and the "sub-logical disk" column is specified with a logical disk number of the "copy destination volume information".

When the main controller 1000 receives a sub-copy group cancel command from the host, it deletes the associated entry from the sub-copy group list 1450, the logical disk list 1430 and the sub-logical disk number table 1440.

(2) Operation Command

The operation command 620 specifies its operation by specifying a copy group. "Option" field is specified with, for example, how uncopied data to volumes of sub-controller due to a suspend command is to be handled. The option may include two or more specifications. For instance, if a "copy start" command is entered in the "op-code" field, the copy is initiated for the specified copy group. If a "copy suspend" code is entered, the copy operation is temporarily stopped.

In the example of 5A in the copy group list 1420 of FIG. 5, the "copy group number" field is specified with "1" and therefore the copy is started for the copy group number 1. Then, according to the configuration of FIG. 5, the logical disks specified by the "logical disk list number/logical disk number" for the sub-copy group number 1, 2, 3 belonging to the copy group number 1 become the copy destination logical disks.

In this example, from the logical disk list 1 of the sub-copy group number 1, it is seen that logical disks 1, 5, 7 are the copy source logical disks; from the logical disk number of the sub-copy group number 2, a logical disk 3 becomes the copy source logical disk; and from the logical disk number of the sub-copy group number 3, a logical disk 11 becomes the copy source logical disk.

The copy destination logical disks in the sub-controller 2000 that correspond to the copy source logical disks are determined from the sub-logical disk number table 1440 of FIG. 6 and the copy operation is started for the corresponding logical disks.

3.2 Link with System Management Host

Hosts 10, 100 are identified by the software running on them. A host running software for managing the entire computer system (referred to as "system management software") is called a system management host 10. Hosts running application software are simply called hosts 100*a*, 100*b*.

Now, how the system management host and the hosts establish a link with the controller will be explained by referring to FIG. 1.

The hosts 100 have software such as storage control software 180, an application 140 and an agent 160.

The storage control software 180 has a module to convert a user request into a command for the controller external interface and a module to execute the storage control program issued by the system management host. The agent 160 has a module to operate software on the host 100 according to an instruction from system management software 15 running on the system management host 10. The system management host 10 has software such as system management software 15. The system management software 15 has a module to manage all elements (hosts, main controller) in the computer system. To manage all the elements in the computer system, the system management host is connected to the hosts and the main controller through a communication channel 17.

The copy operation by the main controller and the sub-controller is performed as follows.

First, the system management software running on the system management host retrieves from the main controller information on all logical disks in the main controller. It also retrieves from individual hosts information on storage areas under the control of each host and all copy groups and sub-copy groups. Information on logical disks in the sub-controller may be retrieved as follows. The system management host 10 issues an instruction to the main controller which in turn communicates with the sub-controller to retrieve the logical disk information. Or the communication channel 17 may be extended not only to the main controller but also to the sub-controller so that the system management host 10 can directly retrieve the information from the sub-controller through the communication channel 17. Based on these information, the relation among copy groups, sub-copy groups, and volumes and logical disks in each host is built. Based on this relation thus built, a copy program is created according to a policy dictated by the user. The word "policy" as used here refers, for instance, to performing a disaster recovery copy at particular time intervals. The program may be created directly by the user. The program thus generated is sent by the system management software through the agent 160 to a particular host for storing. The host that received the program uses an instruction from the agent as a trigger to execute the program. The execution of the program mainly acts on the storage control software. The storage control software, according to the instruction of the program, issues a copy command to the main controller through the external interface.

In performing copy, there are times when the updating of data used by the application on each host needs to be halted. The system management software therefore establishes a link with the application on each host and issues at an appropriate timing an application quiesce command to the agent on the host.

The agent, according to the command, links with the application and performs a quiesce procedure. After this procedure is complete, the agent returns a completion response to the system management software.

The system management software also needs to establish a link with the storage control software for controlling the storage system. This is done to ensure that the copy is performed at an appropriate timing and that when the copy is finished, the control can be transferred to other storage control software.

The system management software uses the returned completion response as a trigger to issue a command for starting other IO processing, as required, to the agent of the host storing the program. According to the command, the agent issues instruction for starting other IO processing to the storage control software or directly to the program.

In a computer system having a plurality of host computers and a storage system, the above embodiment allows any host computer to perform a global backup operation on any arbitrary or entire storage areas in the storage system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system comprising:
   one or more disk devices making up a plurality of storage areas; and
   a storage controller receiving an input/output (I/O) access from a plurality of computers,
   wherein the storage controller stores copy group information for allocating copy groups to selected said storage areas as objects to be copied to other storage areas in other disk devices connected to another storage controller via a communication line,
   wherein the storage controller stores sub-copy group information for allocating at least one sub-copy group to each of the copy groups, and each of said copy groups is predetermined according to a desired requirement regarding objects to be copied, and the at least one sub-copy group is defined for each of the plurality of computers that make an IO access;
   wherein the storage controller stores storage area list information for allocating at least one storage area list having at least one predetermined storage area of the storage areas to the at least one sub-copy group, and the at least one sub-copy group specifies an asynchronous remote copy operation or a synchronous remote copy operation for a corresponding storage area list;
   wherein each of the copy groups has a consistency assurance level defining at least three levels of the consistency assurance, wherein said at least three levels comprise sub-copy group assured in which consistency is assured for all storage areas in the at least one sub-copy group, completely assured in which consistency is assured for all storage areas in the copy group, and unassured in which consistency is unassured,
   wherein the storage controller receives, from any of the plurality of computers, an instruction which designates one among the copy groups to perform a copy operation for the designated copy group of the storage areas, and
   wherein the storage controller:
   determines whether the copy operation is the asynchronous remote copy operation or the synchronous remote copy operation according to the one of the plurality of computers corresponding to the instruction and the at least one sub-copy group allocated to the designated copy group,
   when it is determined that the copy operation is the asynchronous remote copy operation, the storage controller:
   checks a consistency assurance level for the designated copy group to determine if the designated copy group is completely assured, sub-copy group assured or unassured according to the designated copy group,
   assigns a corresponding consistency group number based on the determined consistency assurance level before performing the copy operation,
   starts performing the copy operation, and
   when a fault occurs in the copy operation of the copy group, suspends the copy operation for all of the storage areas of the designated copy group if the consistency assurance level is completely assured, suspends the copy operation for all of the storage areas for the sub-copy group associated with the fault if the consistency assurance level is sub-copy group assured, or suspends the copy operation for the storage area associated with the fault if the consistency assurance level is unassured in accordance with the consistency group number of the designated copy group; and when it is determined that the copy operation is the synchronous remote copy operation, the storage controller:
checks a consistency assurance level for the designated copy group to determine if the designated copy group is completely assured, sub-copy group assured or unassured according to the designated copy group,
assigns a corresponding consistency group number based on the determined consistency assurance level before performing the copy operation,
starts performing the copy operation, and
when a fault occurs in the copy operation of the copy group, suspends the transfer of write data into a cache and suspends the copy operation for the storage area of sub-copy group allocated to the designated copy group if the consistency assurance level is completely assured, and suspends the copy operation for the storage area of the sub-copy group allocated to the designated copy group if the consistency assurance level is sub-copy group assured or unassured.

2. A storage system according to claim 1, wherein types of operating systems running on the plurality of computers differ from one another and the copy group information designates storage areas that each of the plurality of computers uses.

3. A storage system according to claim 1, wherein each of the copy groups has at least one attribute set in the copy group and the instruction which the storage controller receives designates the at least one attribute in the copy group for the copy operation.

4. A control method for controlling a storage system comprising one or more disk devices making up a plurality of storage areas; and a storage controller receiving an input/output (I/O) access from a plurality of computers,
wherein the storage controller stores copy group information for allocating copy groups to selected said storage areas as objects to be copied to other storage areas in other disk devices connected to another storage controller via a communication line,
wherein the storage controller stores sub-copy group information for allocating at least one sub-copy group to each of the copy groups, and each of said copy groups is predetermined according to a desired requirement regarding objects to be copied, and the at least one sub-copy group is defined for each of the plurality of computers that make an IO access;
wherein the storage controller stores storage area list information for allocating at least one storage area list having at least one predetermined storage area of the storage areas to the at least one sub-copy group, and the at least one sub-copy group specifies an asynchronous remote copy operation or a synchronous remote copy operation for a corresponding storage area list;
wherein each of the copy groups has a consistency assurance level defining at least three levels of the consistency assurance, wherein said at least three levels comprises sub-copy group assured in which consistency is assured for all said storage groups in the sub-copy group, completely assured in which consistency is assured for all storage areas in the copy group, and unassured in which consistency is unassured, and
wherein the storage controller receives, from any of the plurality of computers, an instruction which designates one among the copy groups to perform a copy operation for the designated copy group of the storage areas,
comprising the steps of:
determining whether the copy operation the asynchronous remote copy operation or the synchronous remote copy operation according to the one of the plurality of computers corresponding to the instruction and the at least one sub-copy group allocated to the designated copy group;
when it is determined that the copy operation is an asynchronous remote copy operation:
checking a consistency assurance level for the designated copy group to determine if the designated copy group is completely assured, sub-copy group assured or unassured according to the designated copy group,
assigning a corresponding consistency group number based on the determined consistency assurance level before performing the copy operation,
starting to perform the copy operation, and
when a fault occurs in the copy operation of the copy group, suspending the copy operation for all of the storage areas of the designated copy group if the consistency assurance level is completely assured, suspending the copy operation for all of the storage areas for the sub-copy group associated with the fault if the consistency assurance level is sub-copy group assured, or suspending the copy operation for the storage area associated with the fault if the consistency assurance level is unassured; and
when it is determined that the copy operation is the synchronous remote copy operation:
checking a consistency assurance level for the designated copy group to determine if the designated copy group is completely assured, sub-copy group assured or unassured according to the designated copy group,
assigning a corresponding consistency group number based on the determined consistency assurance level before performing the copy operation,
starting to perform the copy operation, and
when a fault occurs in the copy operation of the copy group, suspending the transfer of write data into a cache and suspending the copy operation for the storage area of sub-copy group allocated to the designated copy group if the consistency assurance level is completely assured, and suspending the copy operation for the storage area of the sub-copy group allocated to the designated copy group if the consistency assurance level is sub-copy group assured or unassured.

5. The control method for controlling a storage system according to claim 4, wherein the plurality of computers run operating systems that differ from one another and the copy group information designates storage areas that each of the plurality of computers uses.

6. The control method for controlling a storage system according to claim 4, wherein at least one attribute is set in the copy group and the instruction designates the at least one attribute in the copy group for the copy operation.

* * * * *